United States Patent
Cheng

(10) Patent No.: US 10,363,989 B2
(45) Date of Patent: Jul. 30, 2019

(54) DUAL PURPOSE CYCLE

(71) Applicant: CHERUB CYCLE ENTERPRISE CO., LTD., Tainan (TW)

(72) Inventor: Wen-Tai Cheng, Tainan (TW)

(73) Assignee: CHERUB CYCLE ENTERPRISE CO., LTD., Tainan (TW)

( * ) Notice: Subject to any disclaimer, the term of this patent is extended or adjusted under 35 U.S.C. 154(b) by 0 days.

(21) Appl. No.: 15/803,451

(22) Filed: Nov. 3, 2017

(65) Prior Publication Data

US 2018/0127053 A1    May 10, 2018

(30) Foreign Application Priority Data

Nov. 4, 2016    (TW) .............................. 105216852 U

(51) Int. Cl.
*B62M 1/38* (2013.01)
*B62K 13/00* (2006.01)
*B62M 3/00* (2006.01)
*B62K 9/00* (2006.01)

(52) U.S. Cl.
CPC .............. *B62M 1/38* (2013.01); *B62K 13/00* (2013.01); *B62M 3/00* (2013.01); *B62K 9/00* (2013.01)

(58) Field of Classification Search
CPC ........... B62M 1/38; B62M 3/00; B62K 13/00; B62K 9/00
See application file for complete search history.

(56) References Cited

U.S. PATENT DOCUMENTS

| | | | | |
|---|---|---|---|---|
| 4,358,967 A * | 11/1982 | Kastan | ................... | B62K 19/34 74/594.1 |
| 4,966,419 A * | 10/1990 | Cunard | ................. | B60B 27/023 301/110.5 |
| 5,819,599 A * | 10/1998 | Yamanaka | .............. | B25B 13/48 74/594.1 |
| 6,264,226 B1 * | 7/2001 | Chang | .................... | B62M 3/003 280/259 |
| 6,276,885 B1 * | 8/2001 | Yamanaka | .............. | B25B 13/48 411/403 |
| 6,305,243 B1 * | 10/2001 | Chiang | .................... | B62M 3/00 280/259 |
| 6,393,939 B1 * | 5/2002 | Yamanaka | .............. | B25B 13/48 74/594.1 |
| 6,415,684 B1 * | 7/2002 | Yamanaka | .............. | B25B 13/48 74/594.1 |
| 7,240,907 B2 * | 7/2007 | Chen | ........................ | B62K 9/02 280/259 |

(Continued)

*Primary Examiner* — Jacob B Meyer
(74) *Attorney, Agent, or Firm* — Muncy, Geissler, Olds & Lowe, P.C.

(57) ABSTRACT

A dual purpose cycle includes a frame unit, a wheel unit, a hub unit, and two crank arm units. The wheel unit includes a front wheel rotatably mounted to the frame unit. The hub unit surrounds an axis, extends though the front wheel, and includes opposite mounting portions respectively disposed at two opposite sides of the front wheel. Each of the mounting portions has an end surface facing oppositely of the front wheel, and an engaging groove indented from the end surface along the axis and having a non-circular cross-section. Each of the crank arm units includes an engaging member having a non-circular cross section, and removably and engagingly inserted into the engaging groove of a respective one of the mounting portions.

5 Claims, 5 Drawing Sheets

(56) References Cited

U.S. PATENT DOCUMENTS

| | | | | |
|---|---|---|---|---|
| 7,527,277 B2* | 5/2009 | Nonoshita | B62M 3/00 | 280/259 |
| 7,798,513 B1* | 9/2010 | Salvant | B62H 7/00 | 280/259 |
| 8,438,947 B2* | 5/2013 | Yamanaka | B62M 3/00 | 74/594.1 |
| 8,578,816 B2* | 11/2013 | Lin | B62M 3/003 | 74/594.1 |
| 8,590,422 B2* | 11/2013 | Kao | B62M 3/00 | 74/594.1 |
| 8,677,859 B2* | 3/2014 | Yamanaka | B62M 3/00 | 74/594.1 |
| 9,248,884 B2* | 2/2016 | Shih | B62M 1/38 | |
| 9,365,261 B2* | 6/2016 | Nonoshita | B62K 19/16 | |
| 9,475,545 B2* | 10/2016 | Yamanaka | B62M 3/00 | |
| 9,487,266 B2* | 11/2016 | Yamanaka | B62M 3/00 | |
| 2004/0200314 A1* | 10/2004 | Hermansen | B62M 3/00 | 74/594.1 |
| 2005/0016323 A1* | 1/2005 | Dal Pra' | B62K 19/16 | 74/594.1 |
| 2005/0022626 A1* | 2/2005 | Vergara | B62M 3/00 | 74/594.1 |
| 2005/0116438 A1* | 6/2005 | Wang | B62M 1/24 | 280/210 |
| 2005/0199092 A1* | 9/2005 | Feltrin | B62K 19/16 | 74/594.1 |
| 2007/0034043 A1* | 2/2007 | Feltrin | B62K 19/16 | 74/594.1 |
| 2007/0227293 A1* | 10/2007 | Valle | B62M 3/00 | 74/594.1 |
| 2007/0241530 A1* | 10/2007 | Nonoshita | B62M 3/00 | 280/259 |
| 2008/0005905 A1* | 1/2008 | Valle | B62M 3/00 | 29/897.2 |
| 2010/0058889 A1* | 3/2010 | Dal Pra | B62K 19/16 | 74/594.1 |
| 2011/0011201 A1* | 1/2011 | Kao | B62M 3/00 | 74/594.1 |
| 2012/0079914 A1* | 4/2012 | Kao | B62M 3/00 | 74/594.1 |
| 2012/0238406 A1* | 9/2012 | Beard | A63B 21/0053 | 482/2 |
| 2013/0087011 A1* | 4/2013 | Yamanaka | B62M 3/00 | 74/594.1 |
| 2013/0133477 A1* | 5/2013 | Yamanaka | B62M 3/00 | 74/594.1 |
| 2014/0144285 A1* | 5/2014 | Yamanaka | B62M 3/00 | 74/594.1 |
| 2014/0182413 A1* | 7/2014 | Yamanaka | B62M 3/00 | 74/594.1 |
| 2016/0016636 A1* | 1/2016 | Thompson | B62M 6/45 | 74/594.7 |
| 2018/0057106 A1* | 3/2018 | Iwai | B62M 3/00 | |
| 2018/0127053 A1* | 5/2018 | Cheng | B62K 13/00 | |
| 2018/0148126 A1* | 5/2018 | Tetsuka | B62M 1/36 | |

* cited by examiner

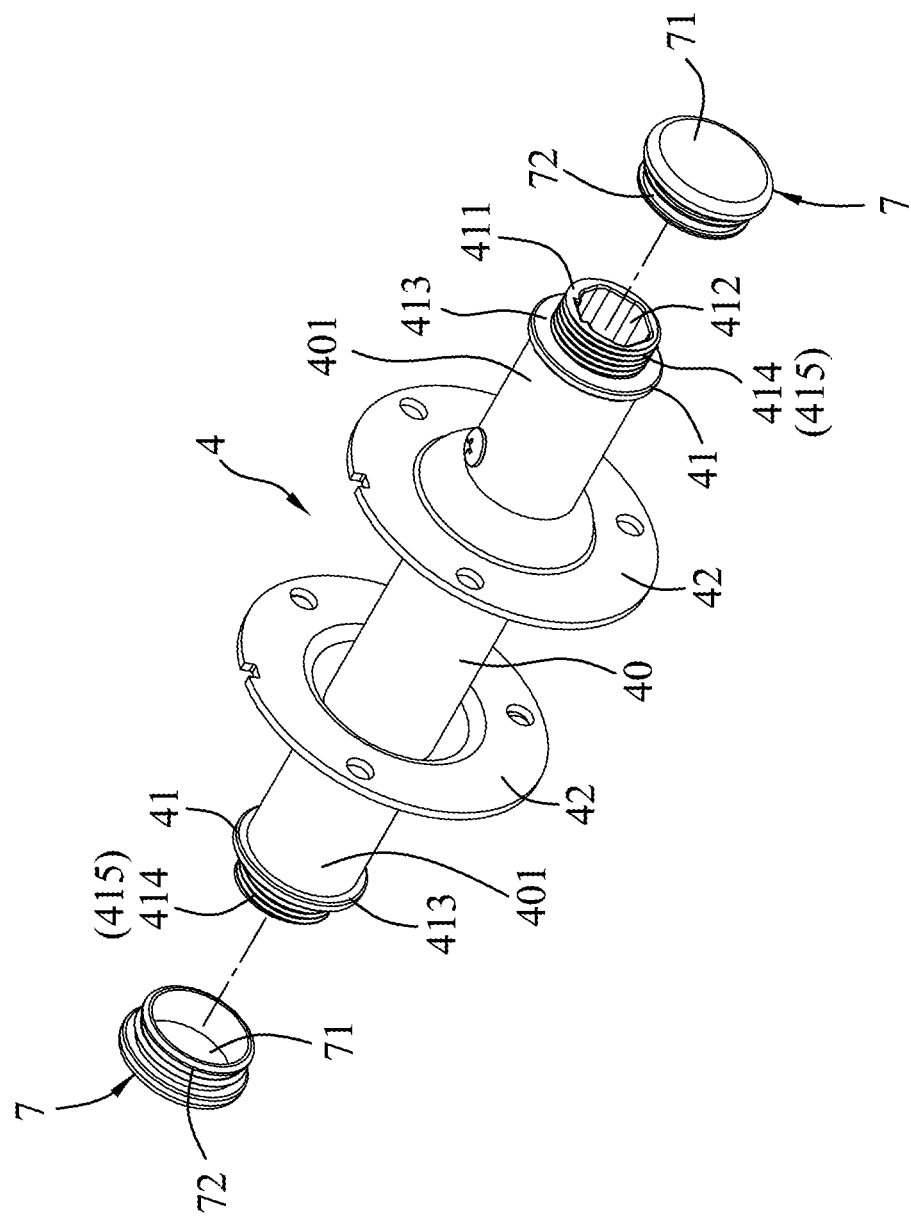

DUAL PURPOSE CYCLE

CROSS-REFERENCE TO RELATED APPLICATION

This application claims priority of Taiwanese Patent Application No. 105216852, filed on Nov. 4, 2016.

FIELD

The disclosure relates to a cycle transport vehicle, and more particularly to a dual purpose cycle.

BACKGROUND

Referring to FIG. 1, a conventional dual purpose bicycle 1 suitable for a child includes a frame member 11, a front wheel 12, two crank arms 13, two pedals 14, a wheel axle 15, and two fastening members 16. The front wheel 12 is mounted to a fork portion of the frame member 11. The wheel axle 15 extends through the fork portion of the frame member 11 and the front wheel 12. Each of the crank arms 13 has a cylindrical coupling portion 131 removably and rotatably engaging a respective one of opposite ends of the wheel axle 15 via a respective one of the fastening members 16, and a distal portion opposite to the coupling portion 131 and connected to a respective one of the pedals 14.

During use, the crank arms 13 can be engaged with the wheel axle 15, and rotation of the front wheel 12 and the crank arms 13 are driven by a child pedaling the pedals 14, so as to allow the movement of the conventional bicycle 1. The child can learn how to ride the bicycle 1 to move back and forth while maintaining his/her balance. On the other hand, the crank arms 13 can be detached from the wheel axle 15, and a child or a toddler can put both feet on the ground and learn how to walk using the conventional bicycle 1 as a baby walker.

However, the fastening members 16 of the conventional bicycle 1 are relatively small in size, and an additional tool (e.g., a screwdriver or a wrench) is required to secure and remove the fastening members 16 to and from the bicycle 1, thereby rendering inconvenience for an operator. Furthermore, such small fastening members 16 may be easily lost during securing and removal processes. In addition, due to the circular configuration of the coupling portions 131, respective engagement between the coupling portions 131 of the crank arms 13 and the opposite ends of the wheel axle 15 is relatively unsecured.

SUMMARY

Therefore, an object of the disclosure is to provide a dual purpose cycle that can alleviate the drawbacks associated with the abovementioned prior art.

According to the present disclosure, the dual purpose cycle includes a frame unit, a wheel unit, a hub unit, and two crank arm units. The wheel unit includes a front wheel rotatably mounted to the frame unit. The hub unit surrounds an axis and extends through the front wheel. The hub unit includes opposite mounting portions that are respectively disposed at two opposite sides of the front wheel. Each of the mounting portions has an end surface facing oppositely of the front wheel, and an engaging groove indented from the end surface along the axis and having a non-circular cross-section. Each of the crank arm units includes an engaging member having a non-circular cross-section, and removably and engagingly inserted into the engaging groove of a respective one of the mounting portions.

BRIEF DESCRIPTION OF THE DRAWINGS

Other features and advantages of the disclosure will become apparent in the following detailed description of the embodiment with reference to the accompanying drawings, of which:

FIG. 5 is an exploded perspective view illustrating the hub unit of the embodiment being connected to two covers.

DETAILED DESCRIPTION

Figure 1:
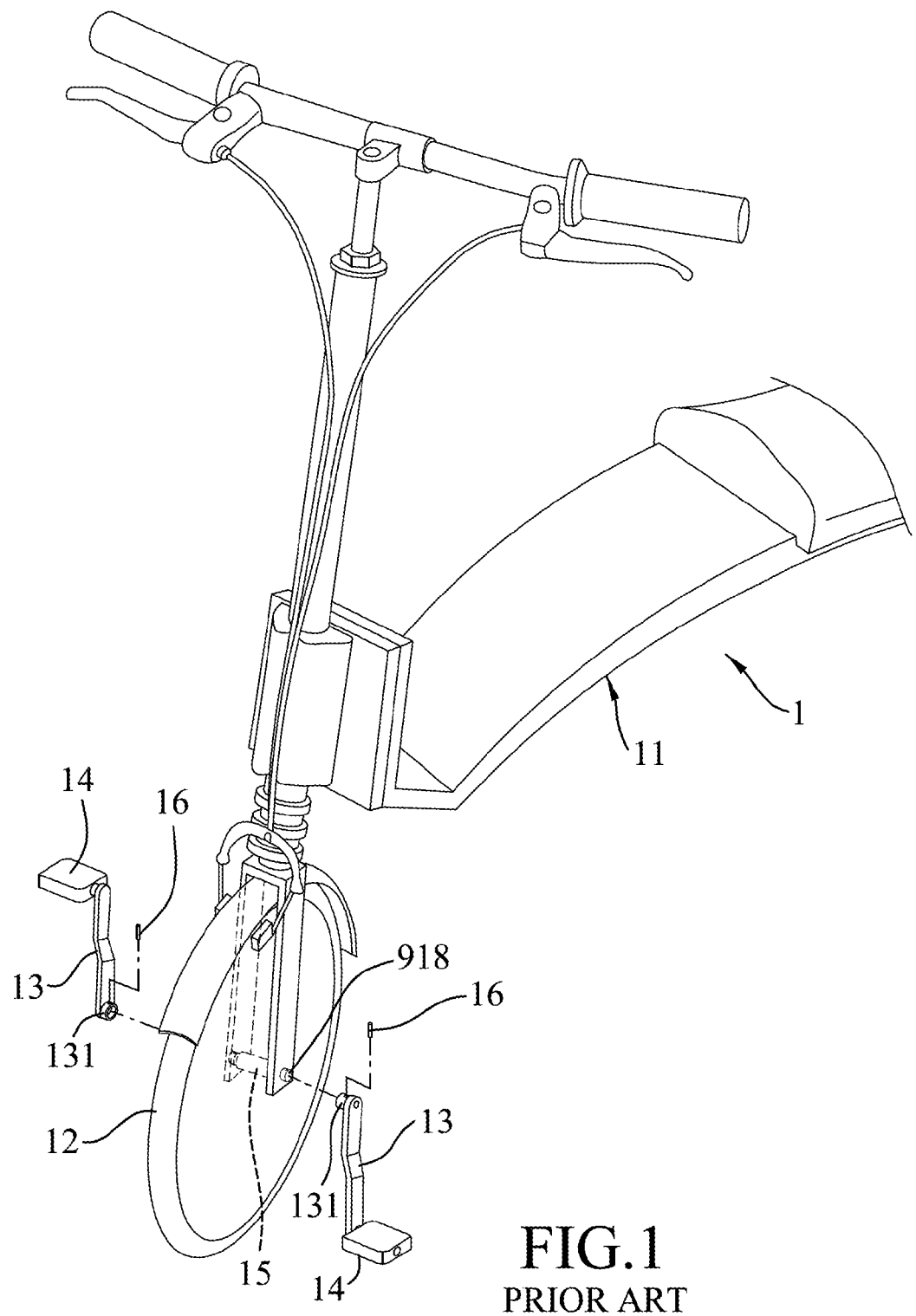
FIG. 1 is a fragmentary perspective view of a conventional bicycle.
Figure 2:
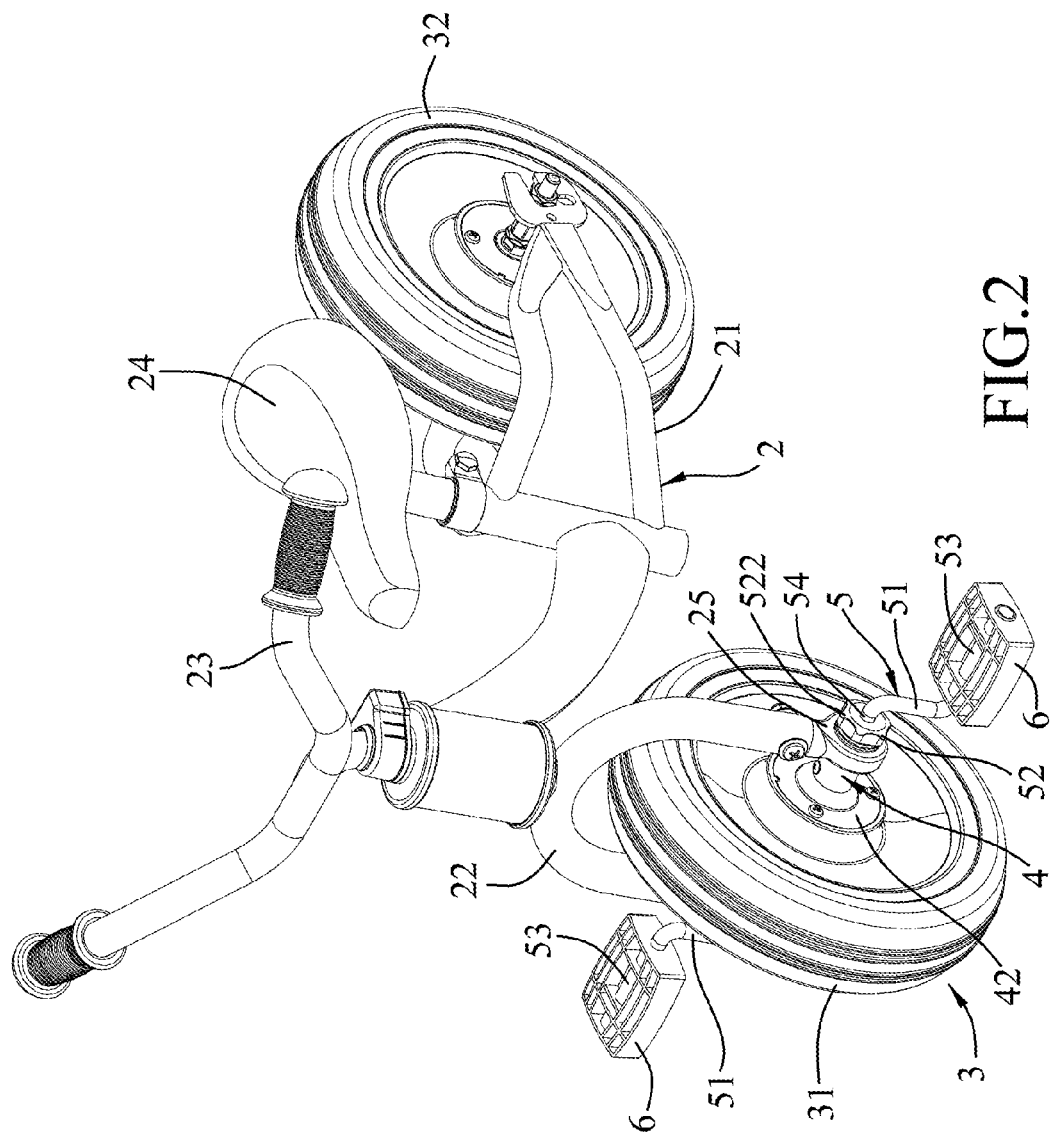
FIG. 2 is a perspective view of an embodiment of a dual purpose cycle according to the present disclosure.
Figure 3:
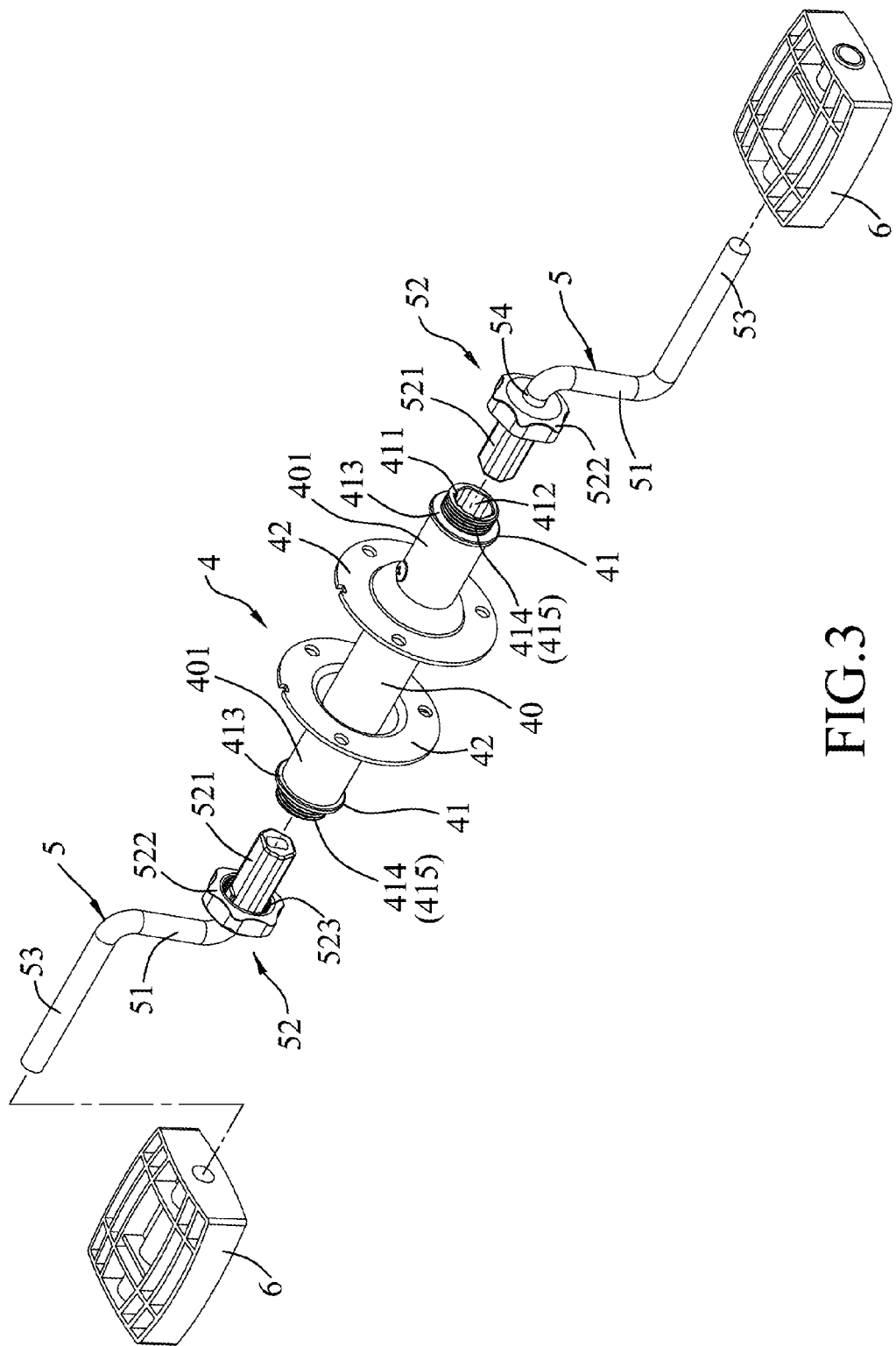
FIG. 3 is an exploded view of a hub unit, two crank arm units, and two pedals of the embodiment.
Figure 4:
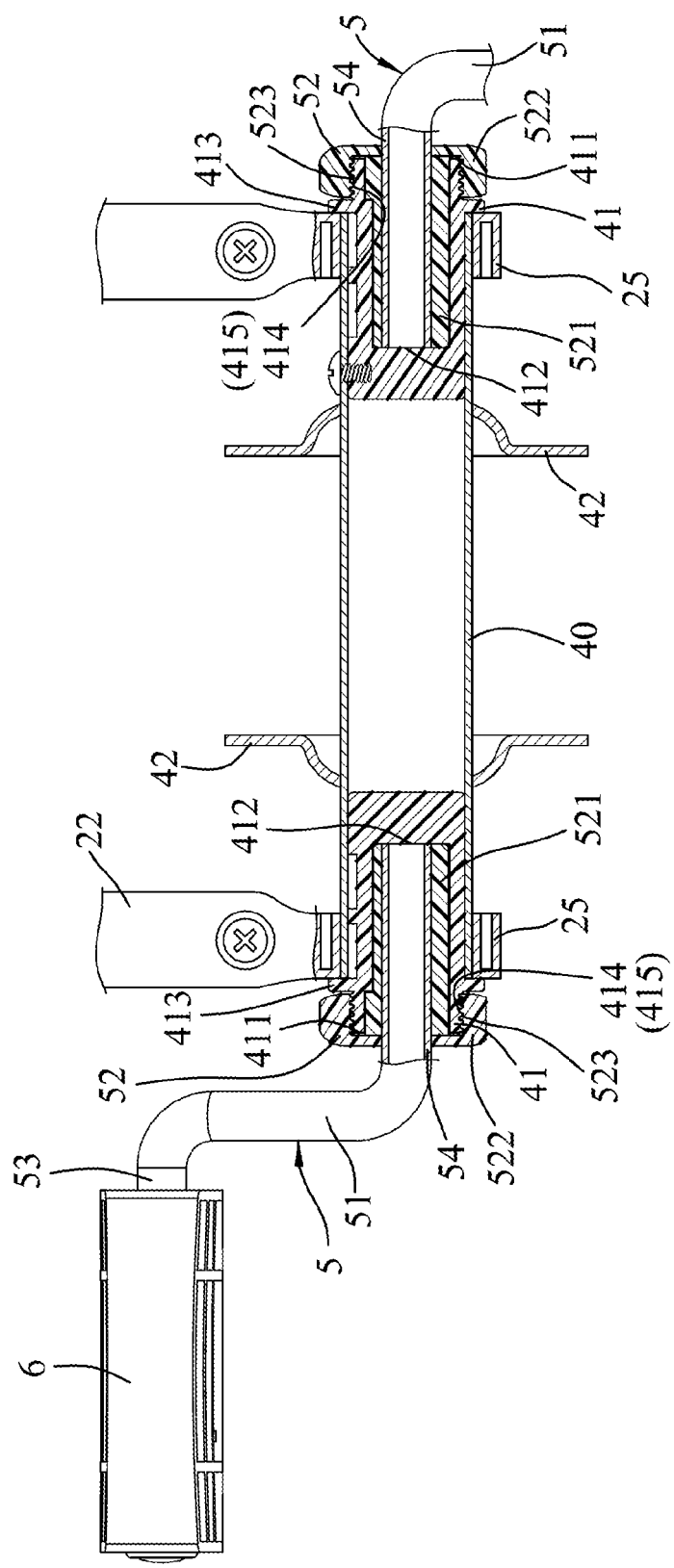
FIG. 4 is a fragmentary sectional view illustrating an assembled state of the hub unit, the crank arm units, and the pedals of the embodiment.

Referring to FIGS. 2 to 4, an embodiment of a dual purpose cycle according to the present disclosure includes a frame unit 2, a wheel unit 3, a hub unit 4, two crank arm units 5, and two pedals 6.

The frame unit 2 includes a frame body 21, a front fork 22, a handlebar 23, and a saddle 24. The front fork 22 is rotatably connected to a front portion of the frame body 21 and has two spaced-apart connecting portions 25 that are formed respectively at opposite bottom ends of the front fork 22. The handlebar 23 is connected to a top end of the front fork 22 and is co-rotatable with the front fork 22 relative to the frame body 21.

In this embodiment, the dual purpose cycle according to the present disclosure is exemplified as a bicycle. The wheel unit 3 has a front wheel 31 that is rotatably connected to a bottom end of the front fork 22 of the frame unit 2 opposite to the handlebar 23, and a rear wheel 32 rotatably connected to a rear portion of the frame body 21 of the frame unit 2. It should be noted that in other embodiments, the number of the rear wheel 32 may vary, and that the wheel unit 3 of this embodiment may further include a pair of balancing wheels respectively connected to two opposite sides of the rear wheel 32.

The hub unit 4 surrounds an axis, and includes a hollow axle 40 that extends through the front wheel 31, and opposite mounting portions 41 that are respectively and fittingly inserted into two opposite end portions 401 of the hollow axle 40 and that are respectively disposed at two opposite sides of the front wheel 31. Each of the mounting portions 41 has an end surface 411 that faces oppositely of the front wheel 31 and that is exposed from a respective one of the end portions 401 of the hollow axle 40, and an engaging groove 412 that is indented from the end surface 411 along the axis and that has a non-circular cross-section. In this embodiment, the engaging groove 412 is exemplified to have a hexagonal cross-section, but shape of the cross-section may vary in other embodiments.

Each of the mounting portions 41 further has an outer surface 414 extending around the engaging groove 412, a stop ring 413 spaced apart from the end surface 411 and extending radially from the outer surface 414, and an external thread 415 formed on the outer surface 414 and proximate to the end surface 411. Specifically, the stop ring 413 of each of the mounting portions 41 abuts against a respective one of the connecting portions 25 of the front fork 22 for preventing movement of the front fork 22 along the axis. The external thread 415 of each of the mounting portions 41 is formed between the end surface 411 and the stop ring 413, and is exposed from the respective one of the end portions 401 of the hollow axle 40. The hub unit 4 further includes opposite ring portions 42 disposed between the mounting portions 41 and spaced apart from each other. Each of the ring portions 42 extends radially from an outer surface of the hollow axle 40, and securely abuts against a respective one of the opposite sides of the front wheel 31 (i.e., the front wheel 31 is clamped between the ring portions 42).

Each of the crank arm units 5 includes a main arm portion 51, a fastening portion 52, a pedal connecting portion 53, and a hub connecting portion 54. The hub connecting portion 54 is bent from the main arm portion 51 to connect a respective one of the mounting portions 41. The pedal connecting portion 53 is bent form the main arm portion 51, and is opposite to the hub connecting portion 54. The fastening portion 52 has an engaging member 521 and a nut 522. The engaging member 521 has a non-circular cross-section corresponding in shape with the engaging groove 412 of a respective one of the mounting portions 41, and is removably and engagingly inserted into the engaging groove 412 of the respective one of the mounting portions 41, such that each of the crank arm units 5 is co-rotatable with the hub unit 4 relative to the front fork 22. The nut 522 is rotatably disposed around the engaging member 521, has an internal thread 523, and engages removably the external thread 415 of a respective one of the mounting portions 41. In this embodiment, the engaging member 521 is configured as a hexagonal tube that sleeves fittingly around the hub connecting portion 54. The nut 522 is configured as a cap nut that is in abutment with the end surface 411 of a respective one of the mounting portions 41, and that is in threaded engagement with the external thread 415 of a respective one of the mounting portions 41.

In this embodiment, the pedals 6 are respectively and rotatably mounted to the pedal connecting portions 53 of the crank arm units 5.

When assembling the crank arm units 5, the engaging member 521 of each of the crank arm units 5 is first inserted into the engaging groove 412 of the respective one of the mounting portions 41 for fittingly engaging therewith. Then, the nut 522 is rotated to threadedly connect the external thread 415 of the respective one of the mounting portions 41 and to abut against the stop ring 413 of a respective one of the mounting portions 41, so as to prevent the release of the engaging member 521 from the engaging groove 412. Afterward, a rider may sit on the saddle 24 with both feet pedaling the pedals 6 to drive the rotation of the front wheel 31 for allowing movement of the rear wheel 32 and the frame unit 2, and with both hands holding the handlebar 23 for controlling the moving direction of the front wheel 31.

Referring to FIG. 5, the dual purpose cycle according to the present disclosure further includes two covers 7 respectively connectable to the mounting portions 41 of the hub unit 4 when the crank arm units 5 are respectively removed from the mounting portions 41. Each of the covers 7 includes a cover wall 71 and a sleeve portion 72 protruding from the cover wall 71. Further referring back to FIG. 3, when the bicycle is used with the crank arm units 5 being removed and is provided with the covers 7, the cover wall 71 of each of the covers 7 removably covers the engaging groove 412 of the respective one of the mounting portions 41, and the sleeve portion 72 removably sleeves around the external thread 415 of the respective one of the mounting portions 41. At this time, backward and forward movement of the bicycle is urged by contact of the rider's feet pushing against the ground. Furthermore, the covers 7 can prevent the rider's feet from being scratched by the mounting portions 41, and thus improving the safety in use of the dual purpose cycle.

In one form, the frame unit 2 may further include a storage box (not shown) mounted below and behind the saddle 24 for storage of unused components. For example, the crank arm units 5 and the pedals 6 removed from the hub unit 4 may be stored in the storage box for convenience.

With the above description, by virtue of the configurations of the mounting portions 41 of the hub unit 4 and the fastening portions 52 of the crank arm units 5, the installation and removal of the crank arm units 5 are convenient to perform without the need of an additional tool. Moreover, since the nut 522 of the fastening portion 52 of each of the crank arm units 5 is disposed around the hub connecting portion 54 in a manner to be engaged with or disengaged from the respective one of the mounting portions 41, and since the nut 522 is integrated with the engaging member 521 and the hub connecting portion 54, the nut 522 is prevented from being lost during the installation and removal of the crank arm units 5.

In the description above, for the purposes of explanation, numerous specific details have been set forth in order to provide a thorough understanding of the embodiment. It will be apparent, however, t one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A dual purpose cycle comprising:
   a frame unit;
   a wheel unit including a front wheel rotatably mounted to said frame unit;
   a hub unit surrounding an axis, extending through said front wheel, and including opposite mounting portions that are respectively disposed at two opposite sides of said front wheel, each of said mounting portions having an end surface that faces oppositely of said front wheel, and
   an engaging groove that is indented from said end surface along the axis, and that has a non-circular cross-section; and
   two crank arm units, each of which includes an engaging member having a non-circular cross-section and removably and engagingly inserted into said engaging groove of a respective one of said mounting portions;
   wherein each of said mounting portions of said hub unit further has an outer surface extending around said engaging groove, and an external thread formed on said outer surface and proximate to said end surface, and each of said crank arm units further includes a nut rotatably disposed around said engaging member, having an internal thread, and engaging removably said external thread of a respective one of said mounting portions;

wherein said hub unit further includes a hollow axle extending through said front wheel, said mounting portions of said hub unit are respectively and fittingly inserted into two opposite end portions of said hollow axle, and said end surface and said external thread of each of said mounting portions are exposed from a respective one of said end portions;

wherein each of said crank arm units further includes a main arm portion, a hub connecting portion bent from said main arm portion to connect a respective one of said mounting portions, and a pedal connecting portion bent from said main arm portion and opposite to said hub connecting portion, said engaging member is configured as a non-circular tube that fittingly sleeves around said hub connecting portion, and said nut is configured as a cap nut that is disposed around said hub connecting portion, that is in abutment with said end surface of a respective one of the mounting portions, and that is in threaded engagement with said external thread of the respective one of said mounting portions.

2. The dual purpose cycle as claimed in claim 1, further comprising two pedals, each of which is rotatably mounted to an end portion of a respective one of said crank arm units distal from said hub unit.

3. The dual purpose cycle bicycle as claimed in claim 2, wherein:

said frame unit includes a front fork having two spaced-apart connecting portions that are formed respectively at opposite bottom ends of said front fork;

said front wheel of said wheel unit is connected to said front fork; and each of said mounting portions of said hub unit further has a stop ring spaced apart from said end surface, extending radially from said outer surface, and abutting against a respective one of said connecting portions of said front fork, said external thread being formed between said end surface and said stop ring.

4. The dual purpose cycle as claimed in claim 1, wherein said engaging member of each of said crank arm units and said engaging groove of each of said mounting portions have a hexagonal cross-section.

5. The dual purpose cycle as claimed in claim 1, further comprising:

two covers respectively connectable to said mounting portions of said hub unit when said engaging members of said crank arm units are respectively removed from said mounting portions, each of said covers including a cover wall that covers removably said engaging groove of a respective one of said mounting portions, and a sleeve portion that protrudes from said cover wall to removably sleeve around said external thread of the respective one of said mounting portions.

* * * * *